US012573965B2

(12) United States Patent
Kumar et al.

(10) Patent No.: US 12,573,965 B2
(45) Date of Patent: Mar. 10, 2026

(54) HARMONIC DISTORTION REDUCTION SYSTEM FOR CONVERTERS CONNECTED TO A COMMON BUS

(71) Applicant: Transportation IP Holdings, LLC, Norwalk, CT (US)

(72) Inventors: Ajith Kuttannair Kumar, Erie, PA (US); Subhas Chandra Das, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 907 days.

(21) Appl. No.: 17/030,562

(22) Filed: Sep. 24, 2020

(65) Prior Publication Data

US 2021/0006178 A1      Jan. 7, 2021

Related U.S. Application Data

(63) Continuation-in-part of application No. 16/377,788, filed on Apr. 8, 2019, now Pat. No. 10,797,614, (Continued)

(51) Int. Cl.
H02M 1/14        (2006.01)
H02M 1/00        (2007.01)
(Continued)

(52) U.S. Cl.
CPC .............. H02M 7/44 (2013.01); H02M 1/14 (2013.01); H02M 1/008 (2021.05);
(Continued)

(58) Field of Classification Search
CPC ........ H02M 3/073; H02M 3/10; H02M 3/135; H02M 3/137; H02M 3/28; H02M 3/315;
(Continued)

(56) References Cited

U.S. PATENT DOCUMENTS 6,094,017 A * 7/2000 Adamson ........... H05B 41/2825
315/282
6,642,669 B1 * 11/2003 MacAdam ......... H05B 41/3925
315/DIG. 4
(Continued)

FOREIGN PATENT DOCUMENTS

CA        2488035 C  *  7/2010  ......... H05B 41/3921
CN        1595782 A      3/2005
(Continued)

OTHER PUBLICATIONS

English Translation of CA2488035 (Year: 2010).*
(Continued)

*Primary Examiner* — Jue Zhang
*Assistant Examiner* — Nusrat Quddus
(74) *Attorney, Agent, or Firm* — K&L Gates LLP

(57)        ABSTRACT

A system is provided that may include plural converters that are connected to a common bus. Each of the converters may be configured to convert an alternating current (AC) through the common bus to a direct current (DC) by alternating switches of each of the plural converters between open and closed states in a switching cycle. The system may also include a controller circuit that may be configured to adjust the AC conducted onto the common bus to the plural converters so that a root mean square of a ripple current component of the AC meets one or more designated criteria.

15 Claims, 12 Drawing Sheets

Related U.S. Application Data which is a continuation of application No. 15/921,299, filed on Mar. 14, 2018, now Pat. No. 10,291,147, which is a continuation-in-part of application No. 15/279,460, filed on Sep. 29, 2016, now abandoned.

(60) Provisional application No. 62/484,773, filed on Apr. 12, 2017.

(51) Int. Cl.
H02M 7/44 (2006.01)
H02M 7/5387 (2007.01)

(52) U.S. Cl.
CPC ...... *H02M 7/5387* (2013.01); *H02M 7/53875* (2013.01); *H02M 7/53876* (2021.05)

(58) Field of Classification Search
CPC .... H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02H 7/261; H02H 7/268; H02J 3/36; H02J 3/01

See application file for complete search history.

(56) References Cited

U.S. PATENT DOCUMENTS

| | | | | |
|---|---|---|---|---|
| 7,489,090 B2 * | 2/2009 | Taipale | H05B 41/2828 | 315/307 |
| 7,696,715 B2 * | 4/2010 | Fisher | H02P 27/04 | 318/800 |
| 8,279,649 B2 * | 10/2012 | Esram | H02M 7/4807 | 700/291 |
| 8,358,398 B2 * | 1/2013 | Wu | G02B 6/2931 | 359/489.08 |
| 8,503,200 B2 * | 8/2013 | Chapman | H02M 7/537 | 363/41 |
| 8,981,751 B1 * | 3/2015 | Young | H02M 3/157 | 323/283 |
| 9,379,641 B2 * | 6/2016 | Potharaju | H02M 7/5387 | |
| 9,590,526 B2 * | 3/2017 | Adest | H02J 3/381 | |
| 9,960,667 B2 * | 5/2018 | Adest | H04B 3/548 | |
| 10,416,201 B2 * | 9/2019 | Zimmermann | G01R 19/02 | |
| 10,727,762 B2 * | 7/2020 | Aeloiza | H02M 1/08 | |
| 10,749,440 B2 * | 8/2020 | Toyoda | H02M 3/33523 | |
| 11,018,623 B2 * | 5/2021 | Loewenstern | H02H 9/02 | |
| 11,296,650 B2 * | 4/2022 | Adest | H02J 3/38 | |
| 11,451,139 B2 * | 9/2022 | Forouzesh | H02M 7/06 | |
| 2007/0274114 A1 * | 11/2007 | Neacsu | H02M 7/493 | 363/132 |
| 2008/0267194 A1 * | 10/2008 | Trethewey | H04L 12/10 | 370/401 |
| 2008/0304300 A1 * | 12/2008 | Raju | H02M 7/217 | 363/125 |
| 2009/0140715 A1 * | 6/2009 | Adest | H02J 3/381 | 323/318 |

| | | | | |
|---|---|---|---|---|
| 2010/0226159 A1 * | 9/2010 | Stern | H02M 7/5395 | 363/132 |
| 2011/0031911 A1 * | 2/2011 | Marcinkiewicz | H02P 23/26 | 318/400.3 |
| 2011/0044077 A1 * | 2/2011 | Nielsen | H02M 5/4585 | 363/127 |
| 2011/0176343 A1 * | 7/2011 | Kojima | B60L 3/00 | 363/132 |
| 2012/0043903 A1 * | 2/2012 | Quayle | H05B 41/2825 | 324/414 |
| 2012/0275196 A1 * | 11/2012 | Chapman | H02M 1/08 | 363/17 |
| 2013/0038306 A1 * | 2/2013 | Kelly | H02M 3/33515 | 323/283 |
| 2013/0215654 A1 * | 8/2013 | Yan | H02M 7/23 | 363/69 |
| 2014/0268959 A1 * | 9/2014 | Frohman | H02M 7/4807 | 363/98 |
| 2015/0188478 A1 * | 7/2015 | Saeki | H02P 29/025 | 318/812 |
| 2015/0303859 A1 | 10/2015 | Yamada et al. | | |
| 2016/0156291 A1 * | 6/2016 | Becker | H02P 21/30 | 318/400.26 |
| 2016/0268917 A1 * | 9/2016 | Ramsay | H02M 7/53871 | |
| 2016/0329832 A1 * | 11/2016 | Aeloiza | H02M 1/12 | |
| 2016/0368917 A1 * | 12/2016 | Zou | A61P 19/02 | |
| 2017/0214314 A1 * | 7/2017 | Jitaru | H02M 1/0085 | |
| 2018/0091036 A1 | 3/2018 | Das et al. | | |
| 2018/0145602 A1 * | 5/2018 | Wei | H02M 5/458 | |
| 2018/0262123 A1 * | 9/2018 | Kalygin | H02M 5/4585 | |
| 2019/0052166 A1 * | 2/2019 | Ali | H02M 7/493 | |
| 2019/0074779 A1 * | 3/2019 | Frampton | H02P 9/14 | |
| 2019/0238061 A1 * | 8/2019 | Kumar | H02M 7/44 | |
| 2020/0244096 A1 * | 7/2020 | Tabuchi | H02M 7/53871 | |
| 2021/0067057 A1 * | 3/2021 | Abarzadeh | H02M 7/4837 | |
| 2021/0184596 A1 * | 6/2021 | Frampton | H02M 1/325 | |
| 2021/0296982 A1 * | 9/2021 | Hafezinasab | H02M 3/1582 | |
| 2022/0376613 A1 * | 11/2022 | Britton | H02M 1/44 | |
| 2023/0031930 A1 * | 2/2023 | Fu | B60L 53/24 | |
| 2023/0130908 A1 * | 4/2023 | Stolt | H02N 2/067 | 310/317 |
| 2024/0235206 A1 * | 7/2024 | Preindl | H02M 7/81 | |
| 2024/0297598 A1 * | 9/2024 | Divan | H02M 3/335 | |

FOREIGN PATENT DOCUMENTS

| | | |
|---|---|---|
| CN | 102340280 B | 2/2012 |
| CN | 104242739 A | 12/2014 |
| CN | 204145326 U | 2/2015 |
| CN | 102388659 B | 12/2015 |
| EP | 2389714 B1 | 7/2019 |
| JP | 2004153918 | 5/2004 |
| JP | 2006187140 | 7/2006 |
| JP | 2011172372 | 9/2011 |
| JP | 2013055790 | 3/2013 |
| JP | 5865842 B2 | 2/2016 |
| WO | 2012125339 A2 | 9/2012 |
| WO | 2015108614 A1 | 7/2015 |
| WO | 2018191108 A1 | 10/2018 |

OTHER PUBLICATIONS

Office Action for corresponding JP Application No. 2021-140328 dated Oct. 31, 2022 (9 pages).

European Search Report for related European Patent Application No. 21196019 dated Feb. 7, 2022 (14 pages).

Barbosa, et al. "Design Aspects of Paralleled Three-Phase DCM Boost Rectifiers", 30th Annual IEEE Power Electronics Specialists Conference., Jan. 1, 1999 (6 pages).

First Examination Report for related Indian Patent Application No. 202114039850 dated Apr. 11, 2022 (5 pages).

Office Action for corresponding CN Application No. 201880024984.3 dated Oct. 31, 2022.

2nd Office Action for corresponding CN Application No. 201880024984.3 dated Aug. 23, 2023 (14 pages).

(56) References Cited

OTHER PUBLICATIONS

Office Action for corresponding EP Application No. 21196019.0-1202 dated 18.04.2023 (7 pages).

\* cited by examiner

300

HARMONIC DISTORTION REDUCTION SYSTEM FOR CONVERTERS CONNECTED TO A COMMON BUS

CROSS-REFERENCE TO RELATED APPLICATIONS

This application is a continuation-in-part of U.S. application Ser. No. 16/377,788, filed 8 Apr. 2019 that is a continuation of U.S. application Ser. No. 15/921,299, filed 14 Mar. 2018 (now U.S. Pat. No. 10,291,147, issued 14 May 2019), which claims priority to U.S. Provisional Application No. 62/484,773, filed 12 Apr. 2017, and is a continuation-in-part of U.S. application Ser. No. 15/279,460, filed 29 Sep. 2016. The entire disclosures of these applications are incorporated herein by reference.

FIELD

Embodiments of the subject matter disclosed herein relate to electrical circuits.

BACKGROUND

A vehicle propulsion system may contain multiple traction inverters connected to a common bus to convert direct current (DC) into alternating current (AC) for a traction motor. Additionally, some powered systems may have multiple auxiliary load inverters connected to the common bus. During the operation of the vehicle propulsion system, inverters are driven with a common switching frequency. Additionally, the inverters deliver a root mean square (RMS) current along the common bus. Conductively coupled to the common bus is a DC link filter capacitor. A size and/or cost of the DC link filter capacitor is selected based on amount of RMS current conducted along the common bus.

Alternatively, vehicle propulsion systems contain multiple traction converters connected to a common bus to convert AC into DC for a battery operated electric motor, or another DC load. During the operation of the vehicle propulsion system, the converters are driven with a common switching frequency and also deliver a ripple current along a common bus. The ripple current, or harmonic distortion results in inefficiencies and waste.

BRIEF DESCRIPTION

In an example embodiment, a system is provided that may include plural converters that are connected to a common bus. Each of the converters may be configured to convert an alternating current (AC) through the common bus to direct current (DC) by alternating switches of each of the converters between open and closed states in a switching cycle. The switching cycle may have a switching frequency and a switching phase. The system may also include a controller circuit configured to adjust the AC conducted onto the common bus to the plural converters so that a root mean square of a ripple current component of the AC that is converted by the plural converters meets one or more designated criteria. The controller circuit may be configured to adjust the AC by controlling at least one of the plural converters.

In another example embodiment, a system is provided that may include plural converters that are connected to a common bus. Each of the converters may be configured to convert an AC through the common bus to DC by alternating switches of each of the plural converters between open and closed states in a switching cycle. The switching cycle may include a switching frequency and a switching phase. The system may also include a controller circuit that may be configured to adjust the AC conducted onto the common bus to the plural converters so that a root mean square of a ripple current component of the AC that may be converted by the plural converters meets one or more designated criteria. In addition, the controller circuit may be configured to adjust the AC by controlling at least one of the plural converters. The system may also have a master controller configured to be operably coupled with the controller circuit and the plural converters. The master controller may be configured to reduce the ripple current component that is conducted onto the common bus by changing the switching cycle of one or more of the plural converters.

In yet another example embodiment, a system may be provided that includes plural converters that are connected to a common bus. Each of the plural converters may be configured to convert an AC through the common bus to DC by alternating switches of each of the plural converters between open and closed states in a switching cycle. The switching cycle may have a switching frequency and a switching phase. The system may also include a controller circuit configured to adjust the AC conducted onto the common bus to the plural converters so that a root mean square of a ripple current component of the AC that is converted by the plural converters may meet one or more designated criteria. The controller circuit may be configured to adjust the AC by controlling at least one of the plural converters. Additionally, the controller circuit may be configured to adjust the ripple current component of the AC by controlling the at least one of the plural converters to apply a phase shift to the switching phase.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein provide systems and methods comprising a plurality of converters connected to a common bus. The converters are configured to convert an alternating current (AC) conducted through the common bus to plurality of DC buses for a DC load. A controller circuit is configured to apply different switching frequencies per cycle between multiple converters, apply phase shift between multiple converters switching at same switching frequency, and apply phase shift in fundamental AC side voltage application. Specifically, the controller circuit adjusts these parameters (in switching and phases) between the different converters, so the AC source side root mean square (RMS) of the harmonic current meets one or more designated criteria. At least one technical effect of the embodiments described herein reduces the RMS, or ripple, current component.

Figure 1:
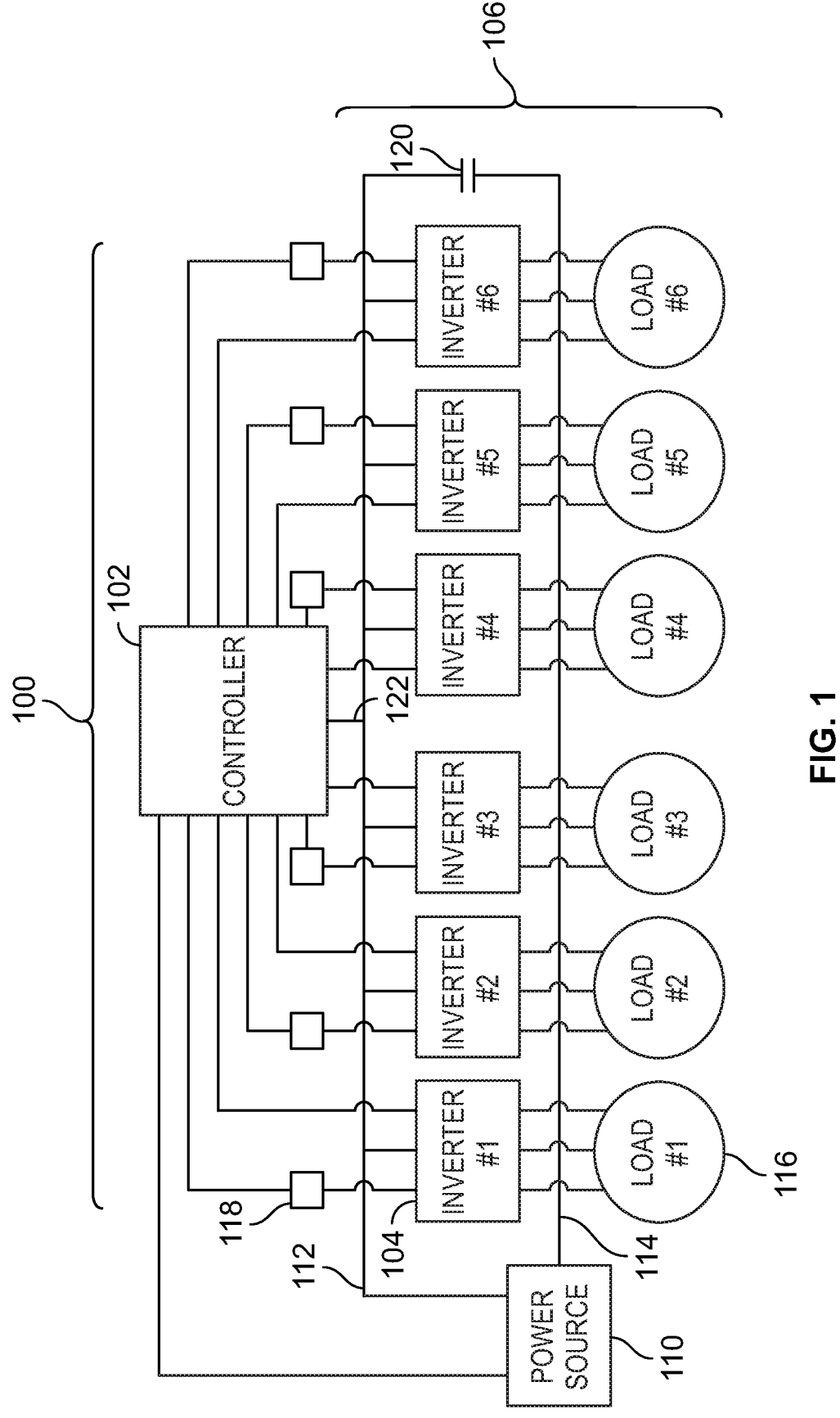
FIG. 1 illustrates an embodiment of an inverter current system.

FIG. 1 illustrates an embodiment of an inverter current system 100. The system 100 includes a controller circuit 102 operably connected with a plurality of inverters 104 ("Inverter #1", "Inverter #2", "Inverter #3", "Inverter #4", "Inverter #5", and "Inverter #6" in FIG. 1) of a circuit 106. The system 100 may be a part of a vehicle. The vehicle may represent a propulsion-generating vehicle system that generates tractive effort to propel the vehicle along a route. In one example, the vehicle may be a rail vehicle such as a locomotive, but alternatively may be another type of vehicle system. For example, the vehicle may be another type of off-highway vehicle (e.g., a vehicle that is not designed and/or not permitted to travel on public roadways), or may be an automobile, mining vehicle, and/or the like. Additionally or alternatively, the system 100 may include or be a stationary system, such as a power generator.

The controller circuit 102 may be connected with the inverters 104 via one or more wired and/or wireless connections to allow the controller circuit 102 to monitor and/or control operations of the inverters 104, as described herein. The controller circuit 102 may be configured to control switching cycles of the inverters 104. The switching cycles may be defined by a series of PWM signals generated by the controller circuit 102. The PWM signals may be a digital signal, such as a square wave, that adjust switches within the inverters 104. The PWM signals may be received from the controller circuit 102 along the wired and/or wireless connection to the corresponding inverters 104. Optionally, the PWM signals may be an asynchronous signal. The controller circuit 102 includes hardware circuitry that includes and/or is connected with one or more processors (e.g., microprocessors, field programmable gate arrays, and/or integrated circuits) that perform the operations described herein. The circuit 106 represents one or more hardware circuits that connect a power source 110 with the inverters 104 along common buses 112, 114. The power source 110 can represent one or more devices capable of providing electric current to the inverters 104 along the common buses 112, 114, such as an alternator and/or generator coupled with an engine, one or more batteries, and/or the like. The common buses may include a positive bus 112, which can conduct a positive portion of a DC from the power source to the inverters 104, and a negative bus 114, which can conduct a negative portion of the DC between the power source 110 with the inverters 104. The buses 112, 114 may be referred to as common buses because multiple inverters 104 are connected with the power source 110 by the same positive DC bus 112 and the same negative DC bus 114. In one embodiment, each of the buses 112, 114 can be a single conductive body or pathway, or multiple conductive bodies or pathways, with the inverters connected to the buses in parallel to each other.

The circuit 106 conducts DC from the power source 110 to the inverters 104, which convert the DC into alternating currents (ACs), which are supplied to multiple loads 116 ("Load #1", "Load #2", "Load #3", "Load #4", "Load #5", and "Load #6" in FIG. 1). The loads 116 can represent a variety of devices that perform work using the AC received from the inverters 104. For example, the loads 116 may represent traction motors, fan motors (e.g., blowers), cooling systems, heating systems, compressors, and/or the like. The number of inverters 104 and/or loads 116 shown in FIG. 1 are provided as one example. Optionally, as few as two inverters or more than six inverters may be used. For example, the system 100 may include fourteen inverters 104 and/or loads 116.

The controller circuit 102 and the power source 110 may be communicatively coupled by one or more wired and/or wireless connections. The controller circuit 102 may monitor operation of the power source 110 based on inputs to and/or outputs from the power source 110. For example, the controller circuit 102 may determine the current demanded from the power source 110 by the loads 116 based on input throttle settings of the motors (e.g., loads).

Operation of the inverters 104 may create or induce a ripple voltage or ripple current on the positive and/or negative DC common buses 112, 114. A capacitor or other capacitive element 120 may be connected between the positive and negative DC common buses 112, 114 to smooth out (e.g., reduce) variations in this ripple voltage or current. For example, the capacitor 120 may be a DC link filter capacitor. It may be noted the circuit 106 may include more than one capacitor 120.

Optionally, the system 100 may include inverter sensors 118 that monitor one or more characteristics of the inverters 104. In one embodiment, the inverter sensors 118 include voltmeters or ammeters that measure the voltages and/or currents conducted to the inverters 104 from the power source 110 via one or more of the common buses 112, 114. As shown in FIG. 1, each inverter 104 may have inverter sensors 118 connected to the inverter 104 for the controller circuit 102 to monitor characteristics of each inverter 104. The inverter sensors 118 are configured to measure the voltages provided to the inverters 104 and/or the currents and/or voltages that are output by the inverters 104. For example, an inverter sensor 118 may be coupled with the inverter 104 between the positive DC bus 112 and the inverter 104 to measure the input voltage or current and one or more additional inverter sensors 118 may be coupled with the inverter 104 between the inverter 104 and the load to measure the AC that is output by the inverter 104.

Figure 2:
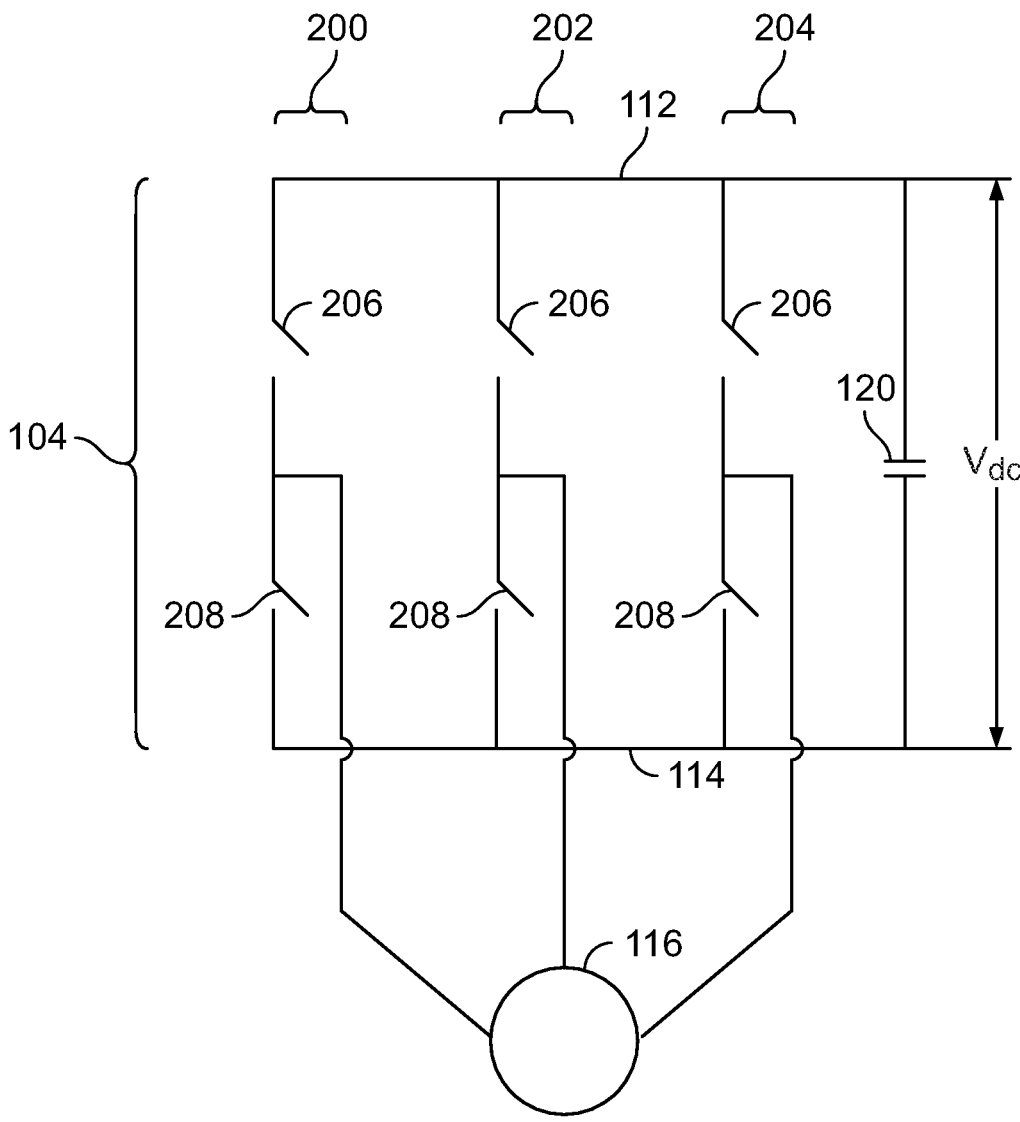
FIG. 2 illustrates an embodiment of an inverter shown in FIG. 1.

FIG. 2 illustrates an embodiment of the inverter 104 shown in FIG. 1. The inverter 104 may be a two level inverter having three sets or legs 200, 202, 204 of positive and negative switches 206, 208. Each leg 200, 202, 204 of the switches 206, 208 is connected with the positive and negative DC buses 112, 114 and converts DC received along the positive DC bus into one phase of the AC that is conducted to the load 116.

The three sets or legs 200, 202, 204 of the switches 206, 208 in the inverter convert the DC received along the same positive DC bus into three different phases of AC supplied to the load. The positive and negative switches 206, 208 in each leg of the inverter 104 may alternate between closed and open states during switching cycles. For example, the positing and negative switches 206, 208 may be controller by the controller circuit 102 utilizing a pulse width modulation (PWM) signal. For example, the PWM signal may define a switching cycle for each of the legs 200, 202, 204 of the inverter 104. The switching cycle defines the time periods that the positive switch 206 in an inverter leg 200, 202, 204 is closed and the negative switch 208 in the same inverter leg 200, 202, 204 is open, the time periods that the positive switch 206 in the inverter leg 200, 202, 204 is open and the negative switch 208 in the same inverter leg 200, 202, 204 is closed, and the frequency (or how rapidly) of the switches 206, 208 alternate between open and closed states. The frequency may correspond to the frequency of the PWM signals generated by the controller circuit 102.

For example, for each leg 200, 202, 204, the positive switch 206 may close while the negative switch 208 in the same leg 200, 202, 204 may open for a first time period to conduct a positive portion of the voltage of the AC to the load. During a different, second time period, the positive switch 206 in the leg 200, 202, 204 may open while the negative switch 208 in the leg 200, 202, 204 closes to conduct a negative portion of the voltage of the AC to the load 116. The positive and negative switches 206, 208 in each leg 200, 202, 204 of the inverter 104 may alternate between open and closed positions, respectively, at a switching frequency of the PWM signals to cause the DC to be converted into the AC.

Commonality in the switching frequencies (based on the PWM signals generated by the controller circuit 102) of the multiple inverters 104 connected to the same positive and negative DC buses 112, 114 (as shown in FIG. 1) increases an RMS current received by the capacitor 120. Additionally, the commonality in the phases of the multiple inverters 104 can create the ripple voltage or ripple current in the circuit 106 of the system 100 shown in FIG. 1, as described in U.S. patent application Ser. No. 15/279,460 filed Sep. 29, 2016 and entitled, "RIPPLE CURRENT REDUCTION SYSTEM," and which is incorporated herein in its entirety by reference.

Figure 3:
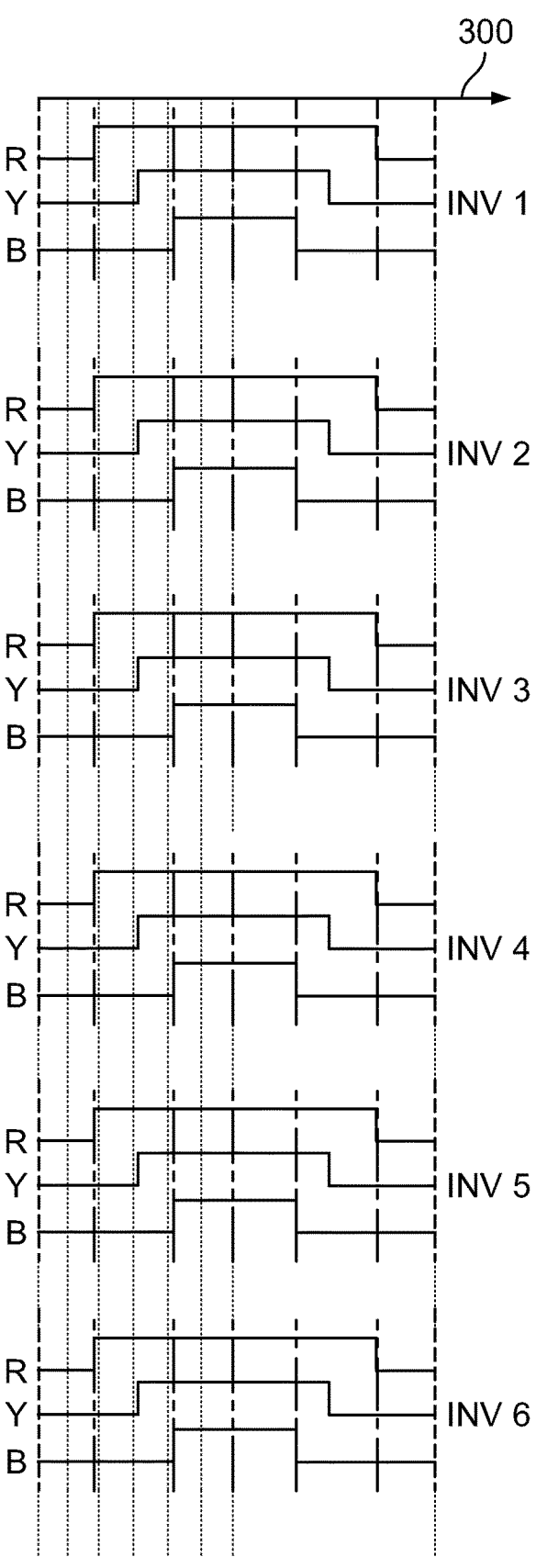
FIG. 3 illustrates switching cycles R, Y, B of the inverters by common pulse width modulation signals.

FIG. 3 illustrates switching cycles R, Y, B of the inverters 104 by common PWM signals. For each inverter 104 ("Inv 1", "Inv 2", "Inv 3", "Inv 4", "Inv 5", and "Inv 6" in FIG. 3), a switching cycle R, Y, B is shown for each of the legs 200, 202, 204 of the inverter 104 (shown in FIG. 2). The switching cycle R can represent the rate at which the positive and negative switches 206, 208 (shown in FIG. 2) of the first legs 200 of the inverters 104 alternate between closed and open states, the switching cycle Y can represent the rate at which the positive and negative switches 206, 208 of the second legs 202 of the inverters 104 alternate between closed and open states, and the switching cycle B can represent the rate at which the positive and negative switches of the third legs 204 of the inverters 104 alternate between closed and open states. The switching cycles for the inverters are shown alongside a horizontal axis 300 representative of time of the switching cycles (e.g., milliseconds). As shown in FIG. 3, the switching cycles are the same for the corresponding legs 200, 202, 204 in each of the inverters 104. This results in the switching cycles for the same legs 200, 202, 204 in the different inverters 104 changing at the same frequency.

Figures 4, 5:
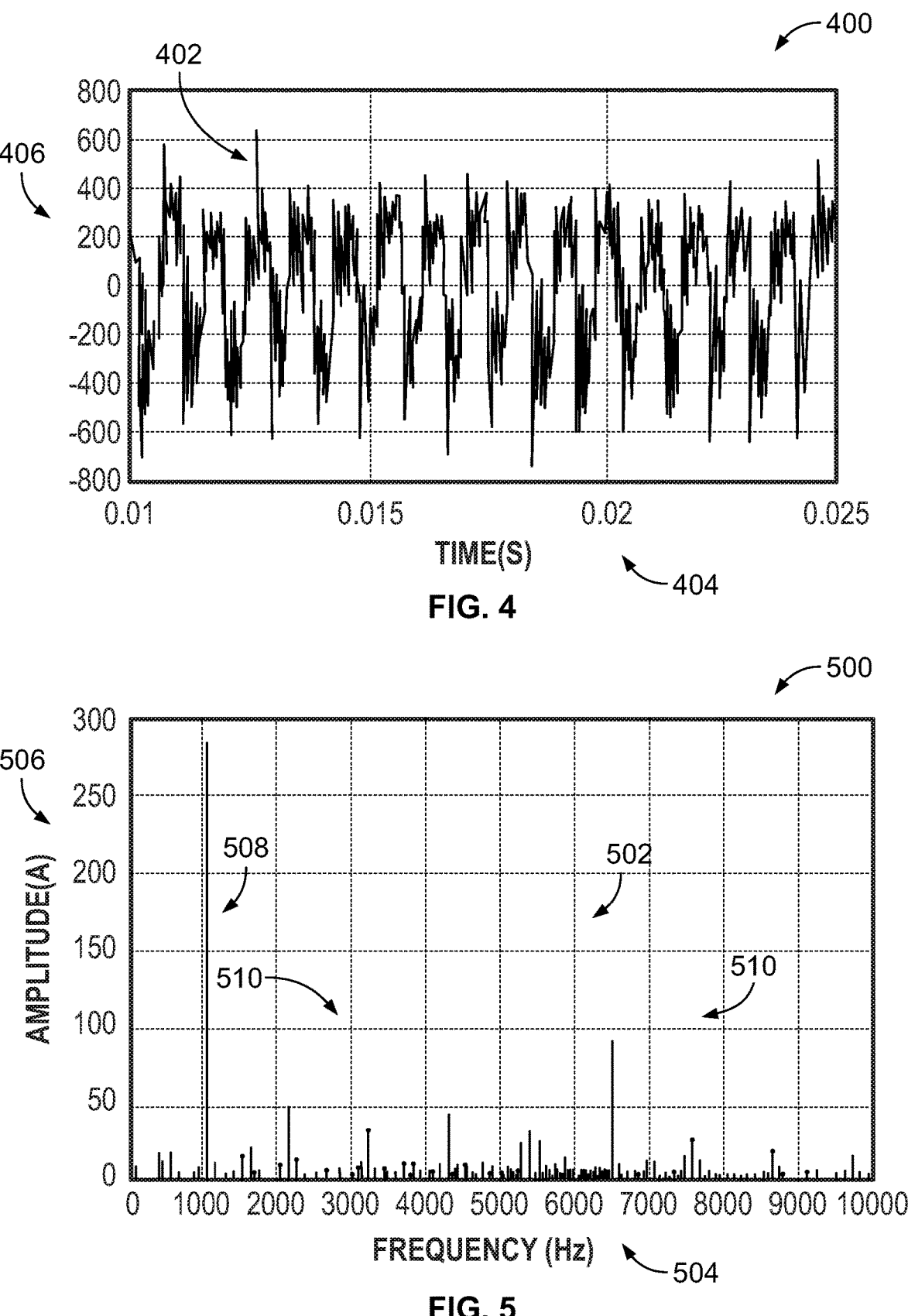
FIG. 4 is a graphical illustration of an embodiment of a current conducted across a capacitor of the inverter current system shown in FIG. 1.
FIG. 5 is a graphical illustration of an embodiment of an amplitude spectrum of currents conducted across the capacitor shown in FIG. 4.

FIG. 4 is a graphical illustration 400 of an embodiment of a current 402 conducted across the capacitor 120 of the system 100. The current 402 shown in FIG. 4 is shown alongside a horizontal axis 404 representative of time of the currents (e.g., in units of seconds) and a vertical axis 406 representative of magnitudes of the current 402 in units of amperes. The common frequency of the PWM signals result in an aggregated current along the common buses 112, 114 and conducted across the capacitor 120 shown as the current 402. For example, the common frequency of the PWM signals generated by the controller circuit 102 may be 540 hertz resulting in a frequency of approximately 1080 hertz across the capacitor 120.

FIG. 5 is a graphical illustration 500 of an amplitude spectrum of currents 502 conducted across the capacitor 120 of the system 100 shown in FIG. 1. The currents shown in FIG. 5 are shown alongside a horizontal axis 504 representative of frequencies of the currents (e.g., in units of hertz) and a vertical axis 506 representative of magnitudes of the currents, such as RMS values of the currents in units of amperes. The currents 502 may include ripple currents conducted on the positive and negative DC buses 112, 114 during a time period of the switching frequencies of the inverters 104 are the same. For example, the currents shown in FIG. 5 may be created when the frequencies of the PWM signals generated by the controller circuit 102 for the inverters 104 are as shown in FIG. 3.

In the illustrated example of FIG. 5, the currents are generated based on the frequencies of the PWM signals of the inverters 104. Since the inverters 104 operate at a common switching frequency, additional peaks 510 in the currents across the capacitor 120 may be generated. The peaks 510 may represent ripple currents conducted along the positive and negative DC buses 112, 114. The peaks 510 may occur along the horizontal axis 504 at or near even multiples of the switching frequency (e.g., twice the switching frequency, four times the switching frequency, six times the switching frequency, and/or the like). A peak 508 is shown at 1080 hertz, indicating a peak frequency of the current across the capacitor 120. The peak 508 may be based on the frequency of the switching cycles of the inverters 104 corresponding to the PWM frequency. The total RMS of the current 502 peaks 508, 510 is over 284 amperes, as shown in FIG. 5. Based on the total RMS, a size and/or cost of the capacitor 120 may be determined.

In order to reduce the RMS current, the controller circuit 102 may be configured to apply a frequency shift to the respective switching cycles of the one or more inverters 104. The shift in switching cycles between the inverters reduces the RMS current across the capacitor 120.

Figure 6:
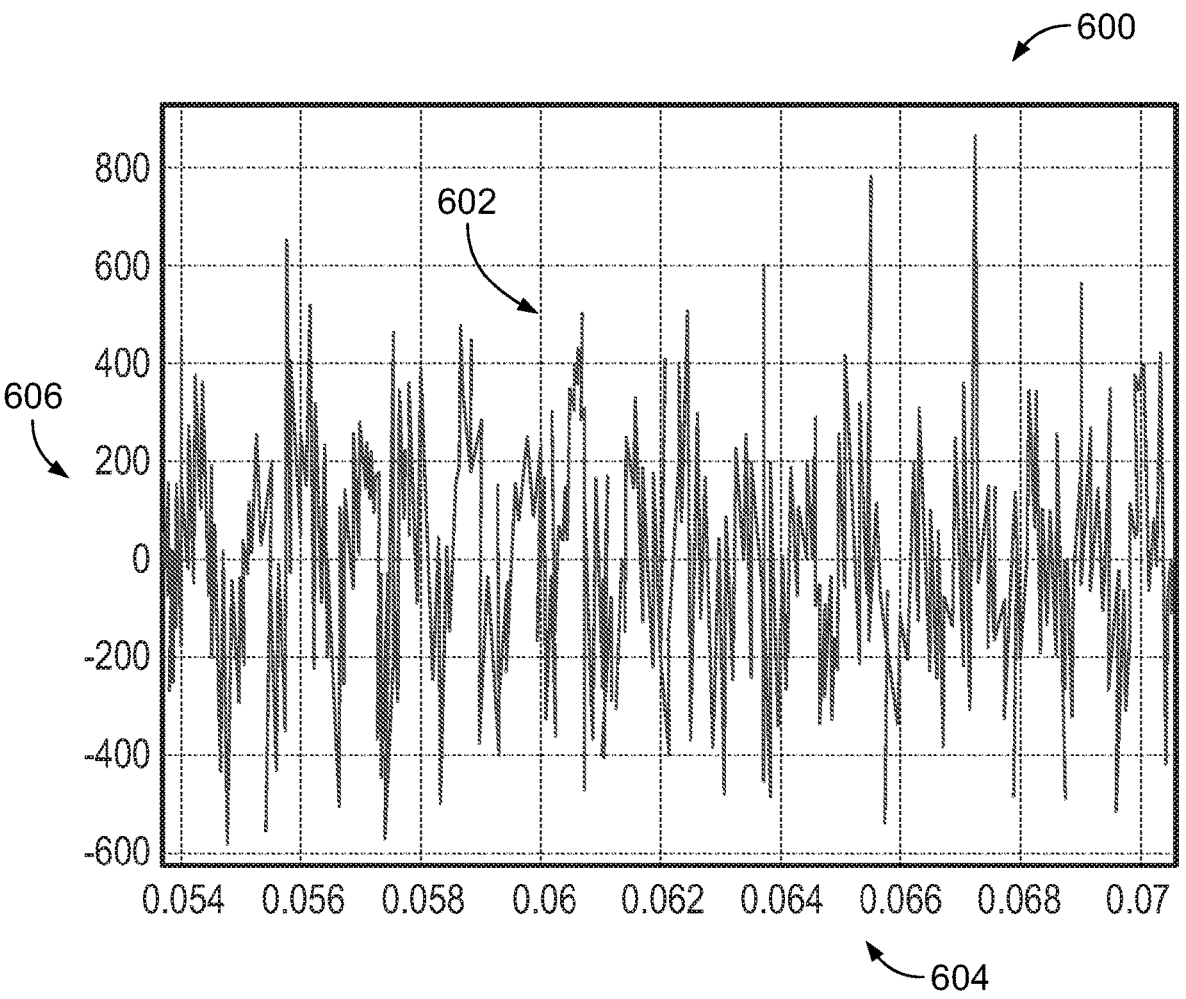
FIG. 6 is a graphical illustration of an embodiment of a frequency shifted current conducted across a capacitor of the inverter current system shown in FIG. 1.

FIG. 6 is a graphical illustration 600 of an embodiment of a frequency shifted current 602 conducted across the capacitor 120 of the system 100. The current 602 shown in FIG. 6 is shown alongside a horizontal axis 604 representative of time of the currents (e.g., in units of seconds) and a vertical axis 606 representative of magnitudes of the current 402 in units of amperes. The current 602 is based on the controller circuit 102 adjusting the PWM frequency for each of the inverters 104. For example, the controller circuit 102 may adjust the PWM frequency for each of the inverters 104 by a determined amount. The determined amount may be a set number of hertz (e.g., five, ten, fifteen, at least ten, and/or the like), a percentage (e.g., 2%, 3%, 5%, at least 2%, and/or the like), based on a number of inverters 104, based on a number of phases of the inverters 104 (e.g., three), and/or the like. For example, the controller circuit 102 may be configured to generate a different PWM frequency for each of the inverters 104, such as 525 hertz, 535 hertz, 545 hertz, 555 hertz, 565 hertz, and 575 hertz.

Additionally or alternatively, the controller circuit 102 may adjust only a portion of the PWM frequencies delivered to the inverters 104, such as two or more of the inverters 104. For example, the controller circuit 102 may adjust at least a first inverter 104 to have a frequency of 540 hertz and at least a second inverter 104 to have a frequency of 546 hertz. Optionally at least two of the inverters 104 may have the same frequency after the frequency shift. For example, three of the inverters 104 may have a frequency of 540 hertz and the remaining inverters 104 have a frequency of 546 hertz. Optionally, a difference between the frequencies may be based on a multiple of three (e.g., six hertz) and/or based on a number of phases of the inverters 104. For example, the inverters 104 may be based on three different phases, the controller circuit 102 may set the first and second frequencies of the switching cycles of the inverters 104 based on a multiple of three.

Figure 7:
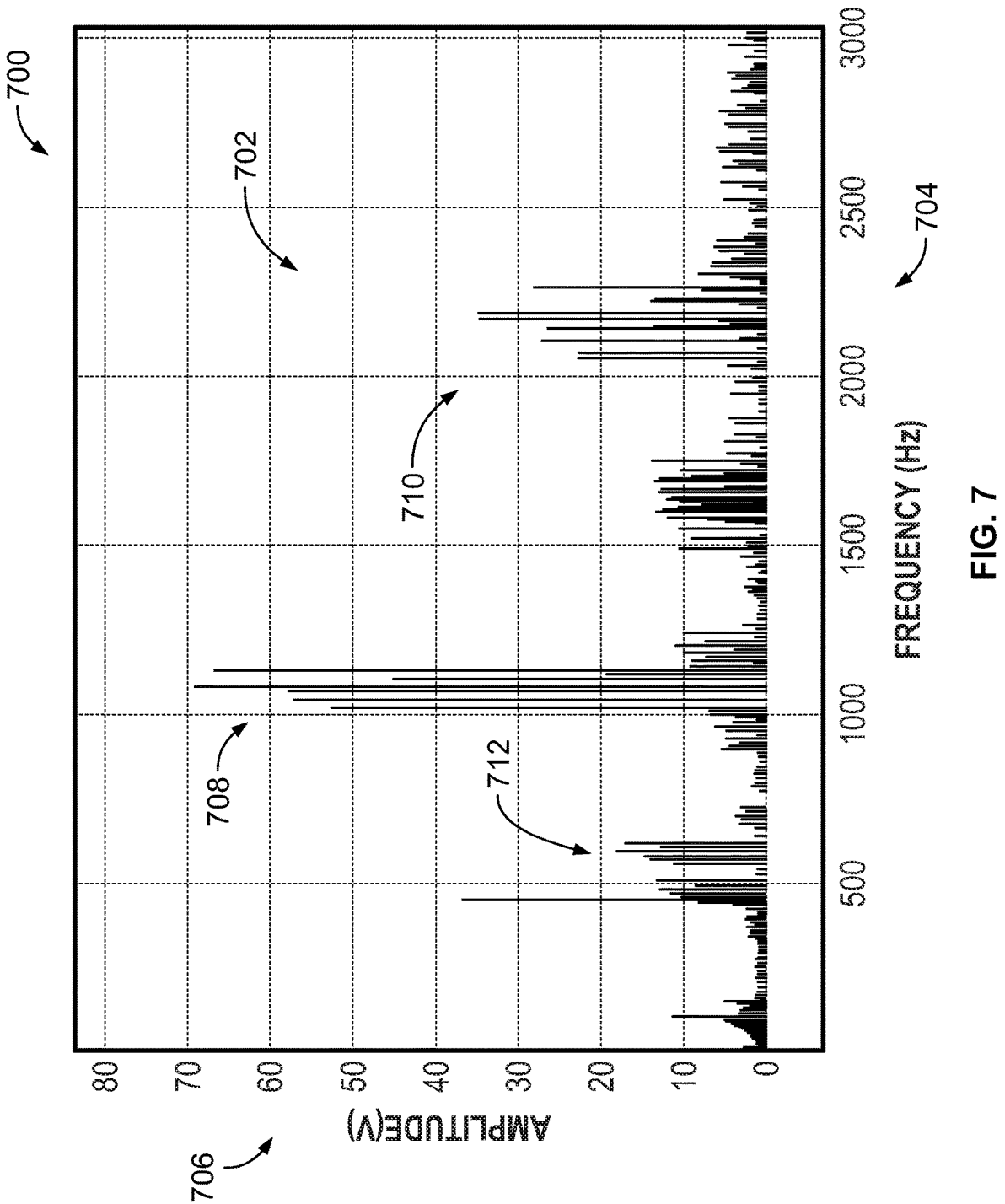
FIG. 7 is a graphical illustration of an embodiment of an amplitude spectrum of currents conducted across the capacitor shown in FIG. 6.

FIG. 7 is a graphical illustration 700 of an embodiment of an amplitude spectrum of currents 702 conducted across the capacitor 120. The currents 702 shown in FIG. 7 are shown alongside a horizontal axis 704 representative of frequencies of the currents (e.g., in units of hertz) and a vertical axis 706 representative of magnitudes of the currents, such as root mean square (RMS) values of the currents in units of amperes. The currents 702 may include ripple currents conducted on the positive and negative DC buses 112, 114 during a time period of the switching frequencies of the inverters 104. The peaks 710, 712 may represent ripple currents conducted along the positive and negative DC buses 112, 114. The peaks 710, 712 may occur along the horizontal axis 704 at or near even multiples of the switching frequency (e.g., twice the switching frequency, four times the switching frequency, six times the switching frequency, and/or the like).

As shown in the graphical illustration 700, the currents 702 do not include the peak 508 frequency of the current across the capacitor 120. Rather, the frequency shift of the PWM frequencies by the controller circuit 102 corresponds to a spreading of the harmonic current spectrum along the common bus 112, 114. For example, a plurality of peaks 708 are shown proximate to the 1080 hertz, however each of the plurality of peaks 708 at a different frequency along the horizontal axis 704. In comparison to the peak 508 shown in FIG. 5, the plurality of peaks 708 represent a spreading of the harmonic current spectrum at different frequency peaks. The plurality of peaks 708 may represent peak frequencies of the inverters 104 based on the frequency shift. For example, each of the peaks of the plurality of peaks 708 may correspond to one of the inverters 104. The plurality of peaks 708 may correspond to 1050 hertz, 1070 hertz, 1090 hertz, 1110 hertz, 1130 hertz, and 1150 hertz based on the PWM frequencies received by the inverters 104.

It may be noted that the currents 702 of the plurality of peaks 708 is lower relative to the peak 508 shown in FIG. 5. For example, the total RMS of the current 702 is approximately 177 amperes. Based on the frequency shift, the RMS of the current 702 is lower relative to the RMS of the current 502, which allows a reduced size and/or cost of the capacitor 120.

Figure 8:
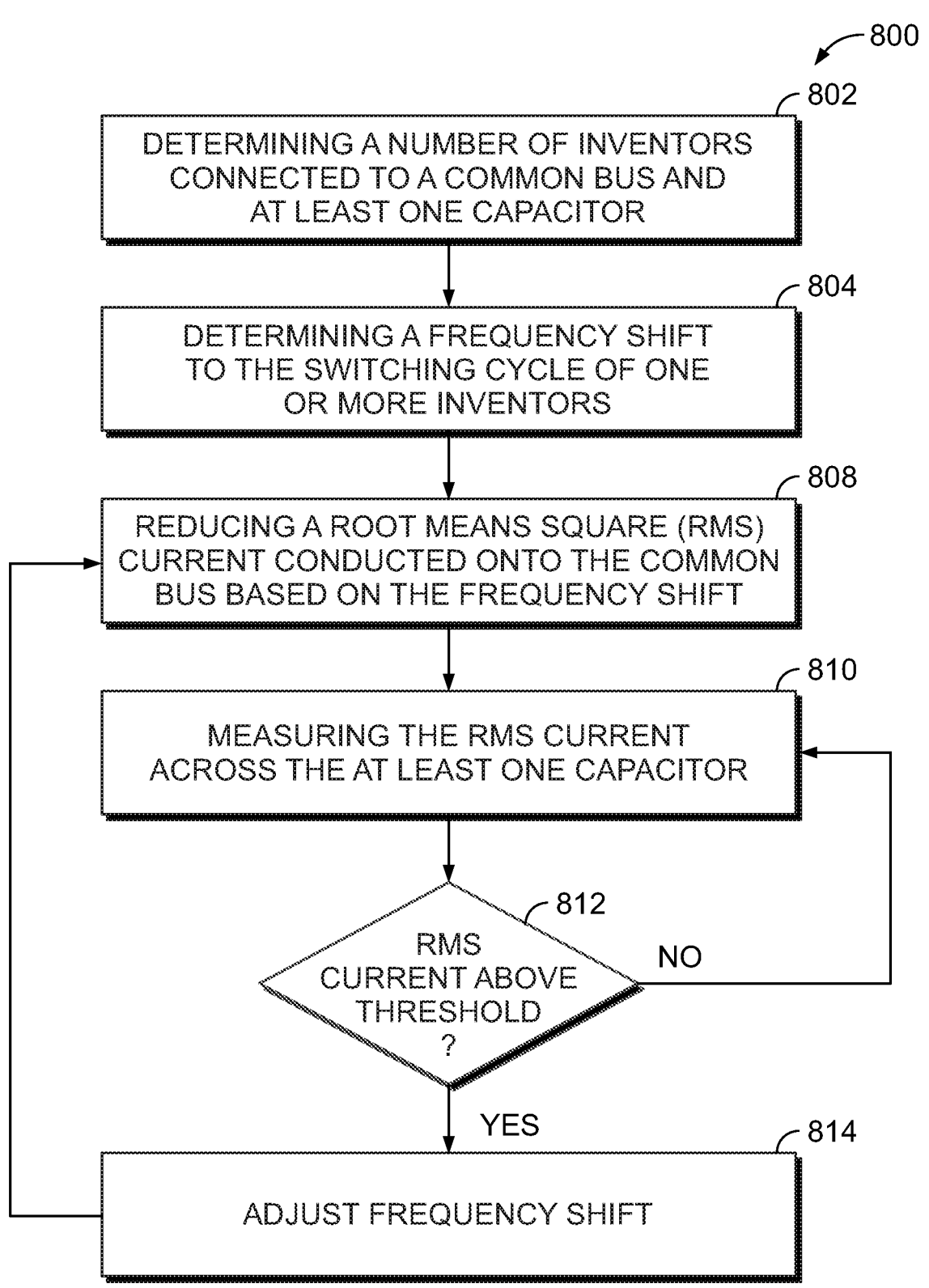
FIG. 8 is a flow chart of a method to reduce a current of an inverter system.

FIG. 8 illustrates a flow chart of a method 800 to reduce a current of an inverter current system 100. The method 800, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 800 may be used as one or more algorithms to direct hardware to perform one or more operations described herein. It should be noted, other methods may be used, in accordance with embodiments herein.

At 802, the controller circuit 102 may be configured to determine a number of inverters 104 connected to a common bus 112, 114 and at least one capacitor 120. The inverters 104 are configured to convert a DC through the common bus 112, 114 to an AC by alternating different switches 206, 208 of the inverters 104 between open and closed sates in a respective switching cycle for each of the inverters 104. The number of inverters 104 may be stored in a memory (e.g., a tangible and non-transitory computer readable medium such as flash memory, RAM, ROM, EEPROM, and/or the like) operatively coupled to the controller circuit 102. Additionally or alternatively, the controller circuit 102 may determine a number of inverters 104 of the system 100 based on a number of PWM signals delivered to the inverters 104.

At 804, the controller circuit 102 may be configured to determine a frequency shift to the switching cycle of the one or more inverters 104. The frequency shift may be determined based on the number of inverters 104. For example, the controller circuit 102 may determine a number of frequencies based on the number of inverters 104. The controller circuit 102 may determine the number of inverters 104 to be six as shown in FIG. 1. For example, the controller circuit 102 may group the inverters 104 into portion having an equal number of inverters 104. The controller circuit 102 may group the inverters 104 into two groups, each having a different frequency. In another example, the controller circuit 102 may group the inverters 104 into three groups. The controller circuit 102 may adjust each of the PWM signals to the three groups to have a different frequency. In another example, the controller circuit 102 may have each of the PWM signals have a different frequency. The PWM signals may represent the respective switching cycles for the inverters 104.

It may be noted that the different frequencies assigned to the groups and/or the inverters 104 may vary based on a determined amount. The determined amount may be stored in the memory. The determined amount may be a set number of hertz (e.g., five, ten, fifteen, at least ten, and/or the like), a percentage (e.g., 2%, 3%, 5%, at least 2%, and/or the like), based on a number of inverters 104, based on a number of phases of the inverters 104 (e.g., three), and/or the like.

At 808, the controller circuit 102 may be configured to reduce an RMS current conducted onto the common bus 112, 114 based on the frequency shift. In connection with FIG. 7, the frequency shift may correspond to spreading of the harmonic current spectrum along the common bus 112, 114. For example, the plurality of peaks 708 may be based on the different frequencies of the PWM signals delivered to the inverters 104 by the controller circuit 102. For example, each of the peaks 708 may correspond to one of the inverters 104 at a frequency of the PWM signal. Based on the frequency shift, the RMS current across the capacitor 120 is reduced.

In connection with FIG. 5, the controller circuit 102 may deliver a common frequency of the PWM signal to each of the inverters 104. Based on the common frequency, the RMS current across the capacitor 120 is approximately 284 amperes.

In connection with FIG. 7, by adjusting the frequencies of the PWM signals of at least two inverters 104, the RMS current is reduced across the capacitor 120 relative to the RMS current shown in FIG. 5.

At 810, the controller circuit 102 may be configured to measure the RMS current across the at least one capacitor 120. For example, the controller circuit 102 may be conductively coupled to the common bus 112, 114 at 122 in FIG. 1. Optionally, the 122 may be a voltage and/or current sensor. Additionally or alternatively, the controller circuit 102 may include an analog to digital converter (ADC) and/or analog front end that is coupled at 122, which measures a voltage and/or current of the common bus 112, 114. The controller circuit 102 may be configured to measure the current across the common bus 112, 114 at the capacitor 120 at 122. Based on the electrical characteristics of the capacitor 120 stored in the memory (e.g., capacitance), the controller circuit 102 may determine the RMS current across the capacitor 120.

At 812, the controller circuit 102 may be configured to determine the RMS current is above a threshold. For example, the threshold may be a determined non-zero threshold stored in the memory. The threshold may be based on the electrical characteristics of the capacitor 120 and an RMS current the capacitor 120 is configured and/or specified to handle within the system 100. For example, the capacitor 120 may be manufactured to handle an amount of current within the system 100. If the current is above the specified current of the capacitor, the capacitor 120 may be damaged and/or become defected. The threshold may be at the specified RMS current and/or less than the specified amount of RMS current for the capacitor 120.

If the RMS current is above the threshold, then at 814, the controller circuit 102 may be configured to adjust the frequency shift. The controller circuit 102 may be configured to increase a number of inverters 104 having different frequencies of the PWM signals for the switching cycle of the inverters 104. In an embodiment, the controller circuit 102 may have two different frequencies of the PWM signals corresponding to two different groups of the inverters 104. For example, the controller circuit 102 grouped the inverters 104 into a first group (e.g., "Inverter #1", "Inverter #2", "Inverter #3" shown in FIG. 1) to have a first frequency of the PWM signal and a second group ("Inverter #4", "Inverter #5", and "Inverter #6" shown in FIG. 1) to have a second frequency (e.g., difference than the first frequency). Based on the RMS current above the threshold, the controller circuit 102 may group the inverters 104 into three different groups each having a different frequency of the PWM signals. For example, the controller circuit 102 grouped a first group of the inverters 104 (e.g., "Inverter #1" and "Inverter #2" shown in FIG. 1) have a first frequency of the PWM signal, a second group (e.g., "Inverter #3" and "Inverter #4") have a second frequency (e.g., different than the first frequency), and a third group (e.g., "Inverter #5" and "Inverter #6") have a third frequency (e.g., different than the first and second frequencies). Additionally or alternatively, the controller circuit 102 may assign a different frequency for each PWM signal delivered to the inverters 104.

Figure 9:
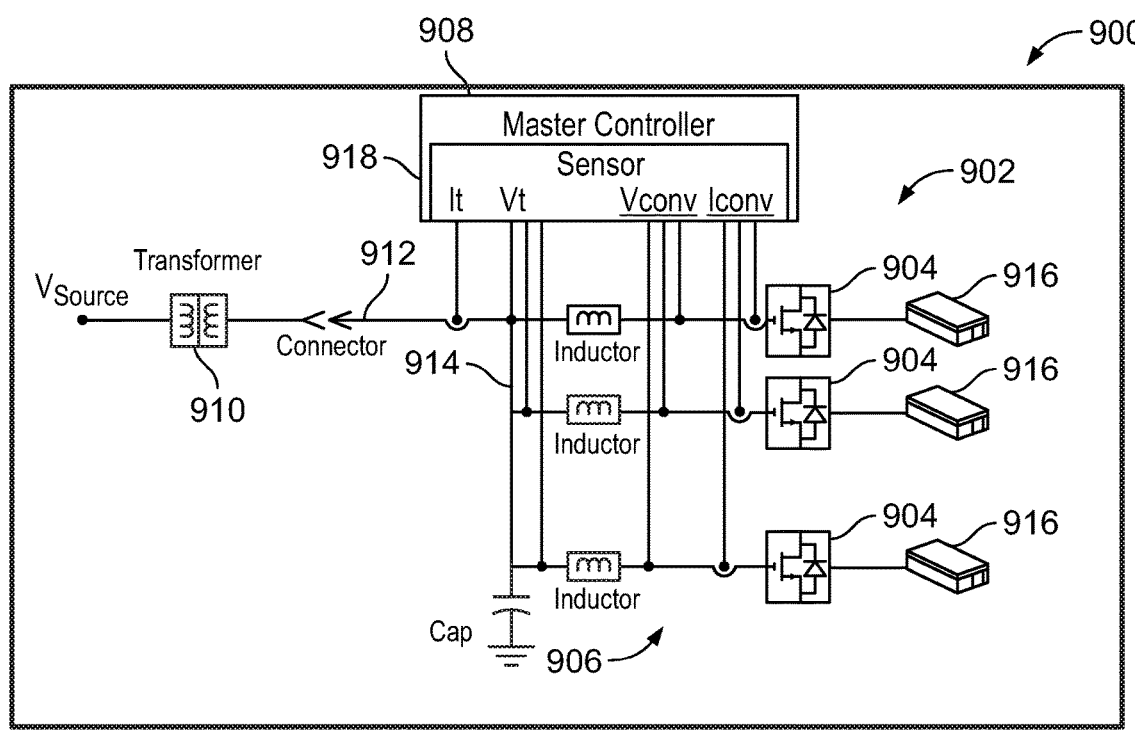
FIG. 9 illustrates an embodiment of a converter current system.

FIG. 9 illustrates an alternate current system 900. In one example, the current system includes a controller circuit 902 operably connected, or coupled, with plural converters 904 ("Converter #1", "Converter #2", and "Converter #3") of a circuit 906. In one example, a master controller 908 is operatively coupled to the controller circuit 902 and circuit 906 to monitor the controller circuit 902, converters 904, and circuit 906 and operate the controller circuit 902 and circuit 906 as described herein in relation to the system 900 and method of FIG. 17. The master controller 908 may be or include a computing device, microcontroller, one or more processor, hardware, program, or the like and may be on-board the vehicle, remote from the vehicle, etc.

The system 900 may be a part of a vehicle. The vehicle may represent a propulsion-generating vehicle system that generates tractive effort to propel the vehicle along a route. In one example, the vehicle may be a rail vehicle such as a locomotive, but alternatively may be another type of vehicle system. For example, the vehicle may be another type of off-highway vehicle (e.g., a vehicle that is not designed and/or not permitted to travel on public roadways), or may be an automobile, mining vehicle, and/or the like. Additionally or alternatively, the system 900 may include or be a stationary system, such as a power generator.

The controller circuit 902 may be connected with the converters 904 via one or more wired and/or wireless connections to allow the controller circuit 902 to monitor and/or control operations of the converters 904, as described herein. The controller circuit 902 may be configured to control switching cycles of the converters 904. The switching cycles may be defined by a series of PWM signals generated by the controller circuit 902. The PWM signals may be a digital signal, such as a square wave, that adjust switches within the inverters 904. The PWM signals may be received from the controller circuit 902 along the wired and/or wireless connection to the corresponding converters 904. Optionally, the PWM signals may be an asynchronous signal. The controller circuit 902 includes hardware circuitry that includes and/or is connected with one or more processors (e.g., microprocessors, field programmable gate arrays, and/or integrated circuits) that perform the operations described herein.

The circuit 906 represents one or more hardware circuits that connect a power source 910 with the converters 904 along common buses 912, 914. The power source 910 can represent one or more devices capable of providing electric current to the converters 904 along the common buses 912, 914. In one example, the power source 910 provides alternating current (AC). In particular, the power source may be a transformer. Specifically, in one example, the power source may be a utility source offboard the vehicle. The buses 912, 914 may be referred to as common buses because multiple converters 904 are connected with the power source 910 by the same AC bus 912 and the same AC bus 914. In one embodiment, each of the buses 912, 914 can be a single conductive body or pathway, or multiple conductive bodies or pathways, with the converters connected to the buses in parallel to each other.

The circuit 906 conducts AC from the power source 910 to the converters 904, which convert the AC into direct currents (DCs), which are supplied to multiple loads 916

("Load #1", "Load #2", and "Load #3" in FIG. 9). The loads 916 can represent a variety of devices that perform work using the DC received from the converters 904. For example, the loads 916 may represent batteries that power wheel, blowers, cooling systems, heating systems, or the like, solar converters, other DC loads, and/or the like. The number of converters 904 and/or loads 916 shown in FIG. 9 are provided as one example. Optionally, as few as two converters or more than ten converters may be used. For example, the system 900 may include twenty converters 904 and/or loads 916.

The controller circuit 902 and the power source 910 may be communicatively coupled by one or more wired and/or wireless connections. The controller circuit 902 may monitor operation of the power source 910 based on inputs to and/or outputs from the power source 910. For example, the controller circuit 902 may determine the current demanded from the power source 910 by the loads 916 based on each DC load 916.

The current system 900 is reversible. In particular, if additional current is needed at other locations of the vehicle, the DC load may provide current for the power source 910 via a first AC common bus 912, and a second AC common bus 914. In one example, the DC load is a battery and DC may be supplied from the battery to at least one converter 904. The at least one converter 904 then converts the DC to AC to be supplied to the power source 910. In this manner, when additional current is desired for other applications of a vehicle system, the DC load may provide this additional current.

Operation of the converters 904 may create or induce a ripple voltage or ripple current on the AC common buses 912, 914. A capacitor or other capacitive element 920 may be coupled to the AC common buses 912, 914 to smooth out (e.g., reduce) variations in this ripple voltage or current. It may be noted the circuit 906 may include more than one capacitor 920.

Optionally, the system 900 may include converter sensors 918 that monitor one or more characteristics of the converters 904. In one embodiment, the converter sensors 918 include voltmeters or ammeters that measure the voltages and/or currents conducted to the converters 904 from the power source 910 via one or more of the common buses 912, 914. As shown in FIG. 9, each converter 904 may have converter sensors 918 connected to the converter 904 for the controller circuit 902 to monitor characteristics of each converter 904. The converter sensors 918 are configured to measure the voltages provided to the converters 904 and/or the currents and/or voltages that are output by the converters 904. For example, a converter sensor 918 may be coupled with the converter 904 between the positive AC bus 912 and the converter 904 to measure the input voltage or current and one or more additional converter sensors 918 may be coupled with the converter 904 between the converter 904 and the DC load to measure the DC that is output by the converter 904.

The controller circuit 902 is configured to reduce the ripple current component resulting from use of the plural converters 904. In one example, to reduce the ripple current component, the controller circuit 902 is configured to apply different switching frequencies per cycle between multiple converters. Optionally, the frequency shift to the switching cycle may be a multiple of a fundamental current component frequency. In another example, to reduce the ripple current, the controller circuit 902 is configured to apply a phase shift between multiple converters switching at same switching frequency. The phase shift may depend one or more factors, such as, on the arrangement of the converters, number of converters, harmonic frequency (in Hz) of interest to be reduced, root mean square value of the harmonic currents to be reduced (for example, to make the harmonic current to be reduced phase shift, values of the filter components (capacitor or inductor) used for different converters (for example, to make the harmonic current to be reduced phase shift of 90° for 4 inverters or 180° for 2 inverters in terms of angle of a switching cycle. Here angle of 1 switching cycle is 360°) The phase shift may be 45°, 60°, etc. similarly. In yet another example, to reduce the ripple current, the controller circuit 902 is configured to apply phase shift in fundamental AC side voltage application. In each example, the controller circuit 902 functions to reduce the ripple current component improving functionality of the current system 900. The controller circuit 902 may also be configured to predict the ripple current component conducted onto the common bus from the plural converters and to reduce the ripple current component that is conducted onto the common bus relative to the ripple current component that is captured as predicted by changing the phase or frequency of the switching cycle of the at least one converter of the plural converters. Specifically, the controller circuit 902 may use the converter sensors 918 to predict the ripple current component, and adjust the phase or frequency of the switching cycle accordingly based on the prediction, instead of waiting for the ripple current component to occur and adjusting thereafter. The ripple current described here could be RMS of all the harmonics. For example, in a 60 Hz AC system the ripple current RMS may include frequencies from 0 to infinity. Alternatively, only select frequency may included in the RMS calculation (example $5^{th}$ and $7^{th}$ harmonic). Another embodiment may include only the weighted RMS current (example sqrt(k8*i8^2+k10*i10^2)) of selected harmonics.

FIGS. 10-15 illustrate graphs of fast Fourier Transforms (FFTs) for the system 900 of the FIG. 9. Specifically, total harmonic distortion may be calculated by measuring the total energy at harmonic frequencies of an input sine wave, squaring each such total energy, adding these squares together, and taking the square root of the sum. The square root of the sum may be referred to as the root mean square. The component of the current or voltage resulting in such harmonic frequencies is referred to as ripple current or ripple voltage. Specifically, for an AC current, the current includes a fundamental current component and a ripple current component, where the ripple current component may be represented by the total harmonic distortion. The ripple current component is undesired, and the graphs of FIGS. 10-15 illustrate how conduction of current through the converters results in total harmonic distortion, and how the controller circuit 902 may be implemented to reduce the total harmonic distortion in the system 900 of FIG. 9. As examples, for each graph, a spectral analysis was conducted for a source current spectrum with a modulation index of 0.725, switching frequency of 720 Hz, and a fundamental frequency component at 60 Hz. But the switching frequency and fundamental frequency can be of any value.

Figure 10:
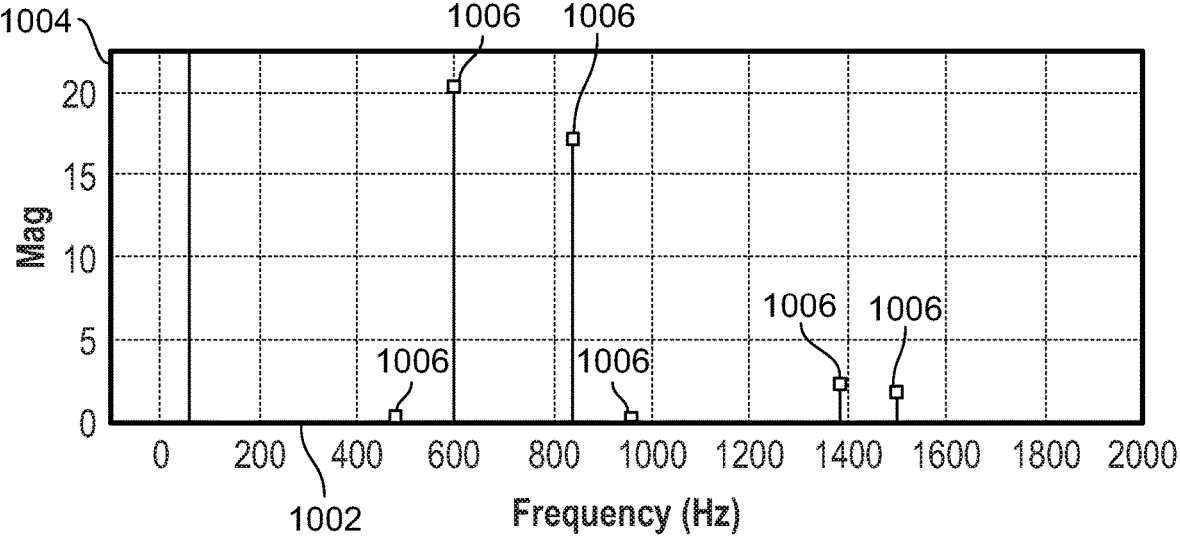
FIG. 10 a graphical illustration of an FFT spectrum analysis for a converter current system.

FIG. 10 illustrates a source current spectrum when only a single converter of the system 900 is operating. Specifically, only one active rectifier is operating. At this point, the controller circuit 902 is not being utilized. The graph provides an X-axis 1002 of frequency in Hertz with the Y-axis 1004 representing magnitude. Each individual point 1006 on the graph represents a harmonic current, with the X-axis representing the frequency at which the harmonic frequency occurs and the Y-axis representing the magnitude or amplitude at the harmonic. To arrive at the total harmonic distortion, the magnitude of each point 1006 is squared, those squares are summed, then the square root of that sum is determined as described above. In this manner the root mean square is provided. In the example figure, with one converter active, the total harmonic distortion in the source current is 11.96% of 225.1 A.

Figure 11:
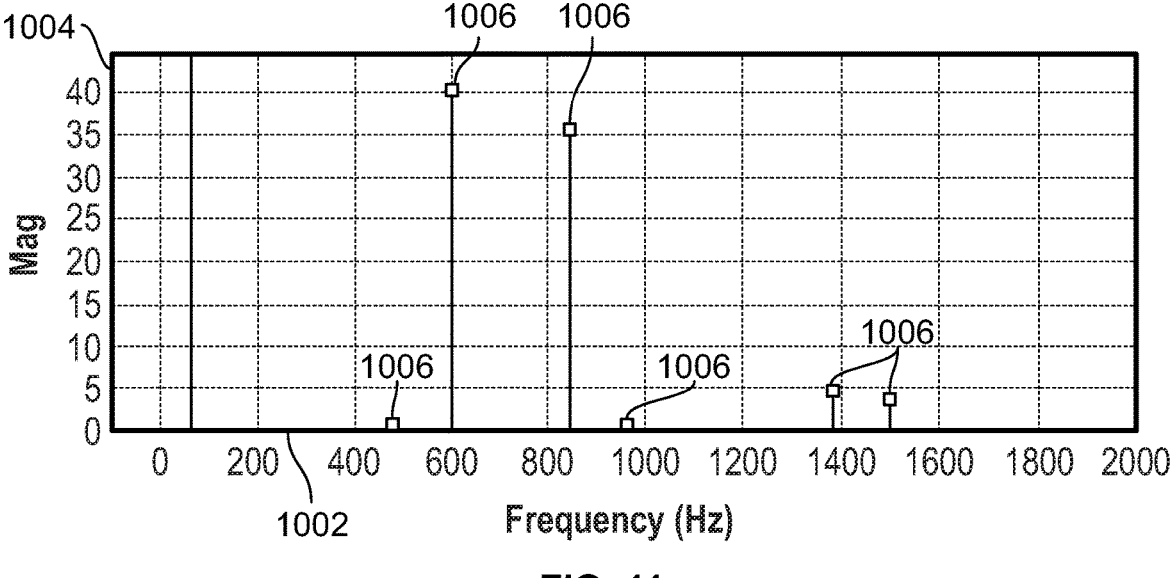
FIG. 11 a graphical illustration of an FFT spectrum analysis for a converter current system.

FIG. 11 illustrates the source spectrum when a first converter and a second converter of the system of 900 is operating. Again, the controller circuit is not being utilized (i.e. no phase shift or frequency shift between converters given). When the second converter is added, as can be seen from the graph, the THD in the source current increases to 19.87% of 270.6 A. Thus, as the number of converters in use increases, the THD of the system similarly increases.

Figure 12:
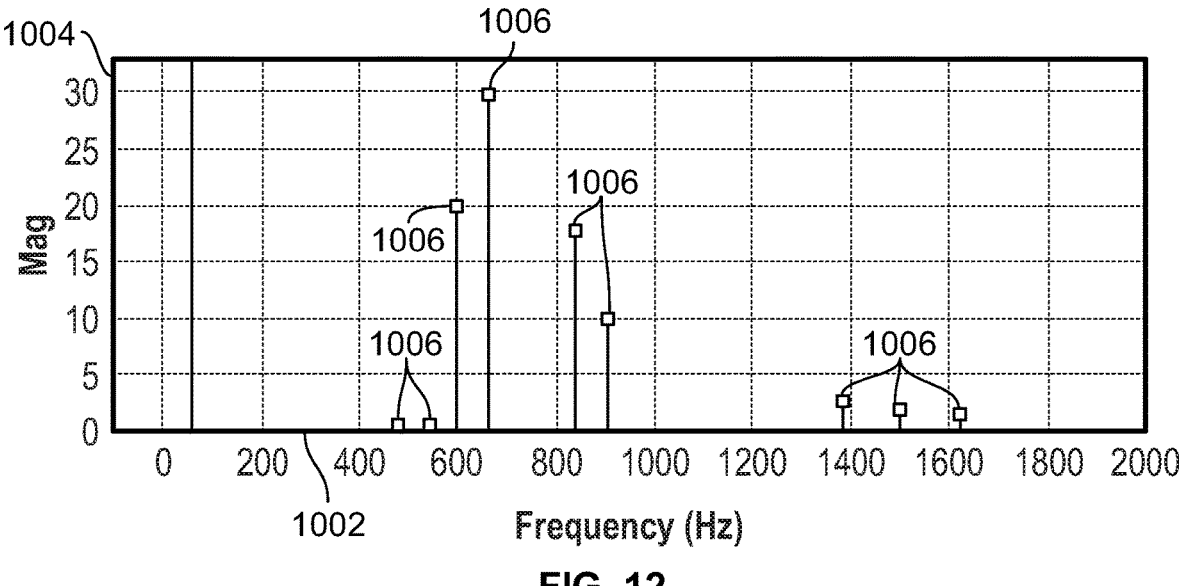
FIG. 12 a graphical illustration of an FFT spectrum analysis for a converter current system.

FIG. 12 illustrates the source spectrum again when a first converter and a second converter of the system 900 are operating. Only, this graph illustrates what occurs when the controller circuit 902 is used to reduce the THD of the system 900. In this example, the controller circuit 902 is configured to adjust the AC conducted onto the common bus to the plural converters so that a root mean square of a ripple current component of the AC that is converted by the plural converters meets one or more designated criteria. In this example the designated criteria is to reduce the THD to be less than 19.87% of 270.6 A. Alternatively, designated criteria may include, but is not limited to at least one of a total harmonic or demand distortion, a total weighted harmonic, a psophmetric current, a harmonic, or the like. To accomplish the designated criteria of reducing THD to be less than 19.87% or 270.6 A, the controller circuit 902 provides different switching frequencies for the first converter and the second converter. As a result, the THD is reduced to 15.3% of 270.6 A. So the designated criteria have been met.

Figure 13:
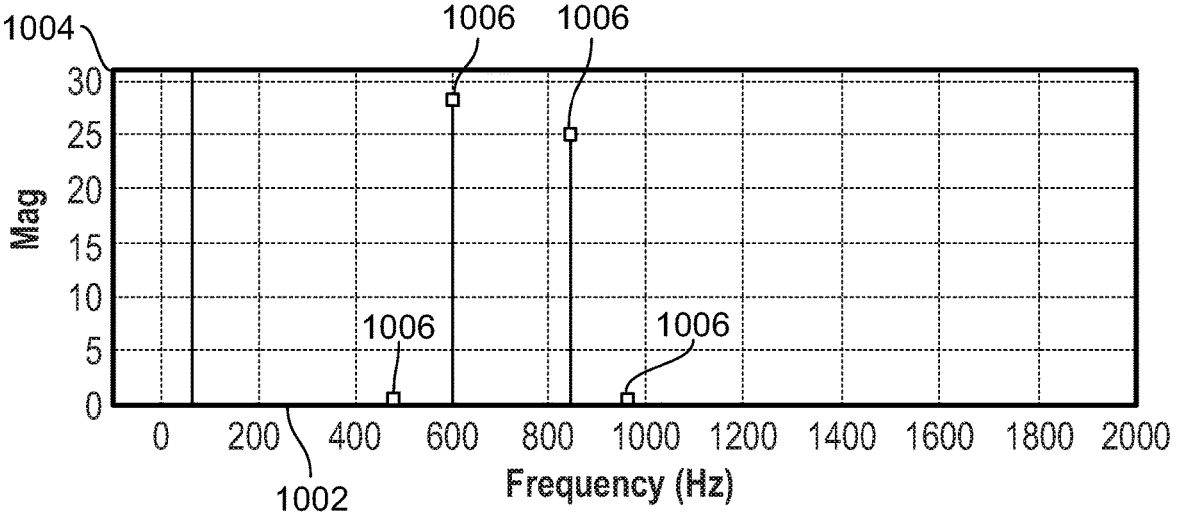
FIG. 13 a graphical illustration of an FFT spectrum analysis for a converter current system.

FIG. 13 illustrates another example of a source spectrum when a first converter and a second converter of the system 900 are operating. Again, the controller circuit 902 is used to reduce the THD of the system 900, and the controller circuit 902 is configured to adjust the AC conducted onto the common bus to the plural converters so that a root mean square of a ripple current component of the AC that is converted by the plural converters meets one or more designated criteria. In this example, the designated criteria is also to reduce the THD to be less than 19.87% of 270.6 A. To accomplish, the controller circuit 902 provides the same switching frequencies for the first converter and the second converter, but shifted by an angle of 90°. As a result, the THD is reduced to 13.97% of 270.6 A, and again the designated criteria have been met. In addition, an improvement over switching frequencies is also provided.

Figure 14:
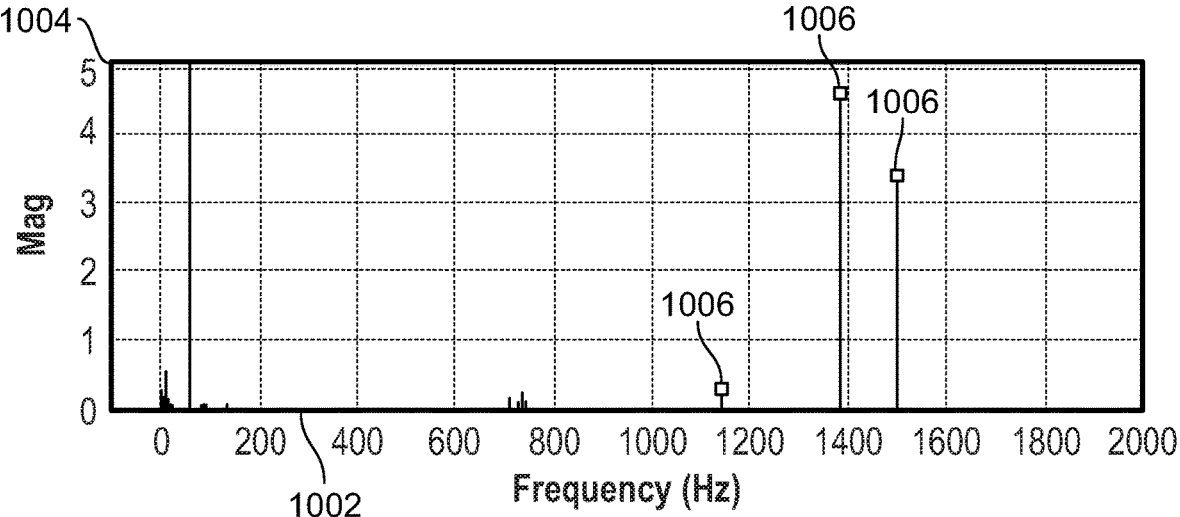
FIG. 14 a graphical illustration of an FFT spectrum analysis for a converter current system.

FIG. 14 illustrates yet another example of a source spectrum when a first converter and a second converter of the system 900 are operating. The controller circuit 902 is used to reduce the THD of the system 900, and the controller circuit 902 is configured to adjust the AC conducted onto the common bus to the plural converters so that a root mean square of a ripple current component of the AC that is converted by the plural converters meets one or more designated criteria. In this example, the designated criteria is also to reduce the THD to be less than 10% of 270.6 A. To accomplish, the controller circuit 902 provides the same switching frequencies for the first converter and the second converter, but shifted by an angle of 180°. As a result, the THD is reduced to 2.11% of 270.6 A, the designated criteria have been met, and a major decrease in THD is accomplished, even compared to the methodologies resulting in the graphs of FIGS. 12 and 13.

Figure 15:
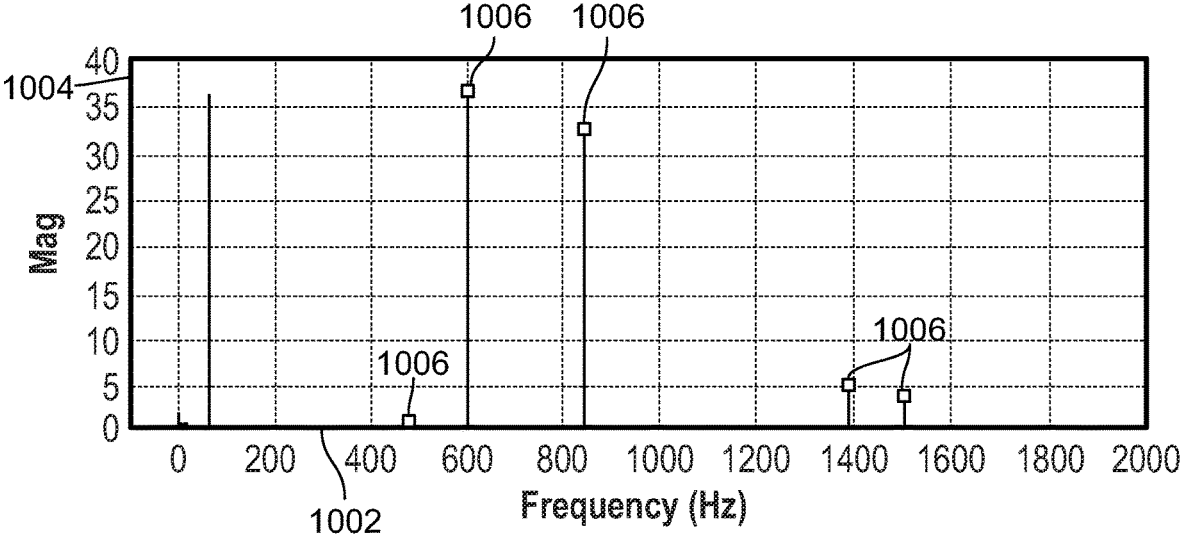
FIG. 15 a graphical illustration of an FFT spectrum analysis for a converter current system.
Figure 16A:
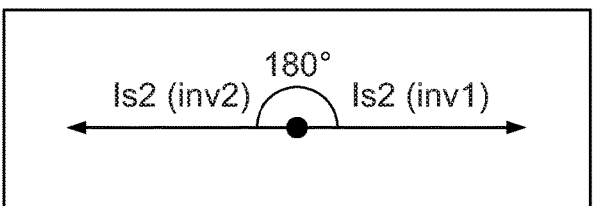
FIG. 16A is a schematic a converter arrangement for a vehicle system.
Figure 16B:
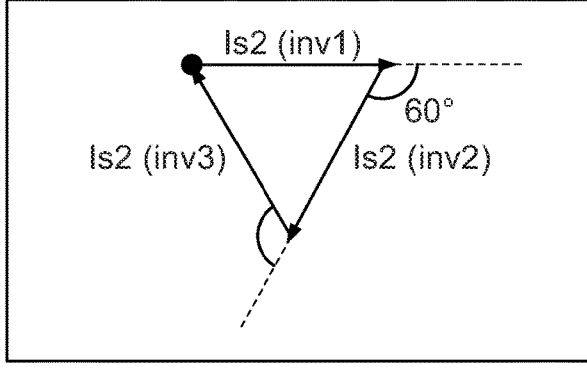
FIG. 16B is a schematic a converter arrangement for a vehicle system.
Figure 16C:
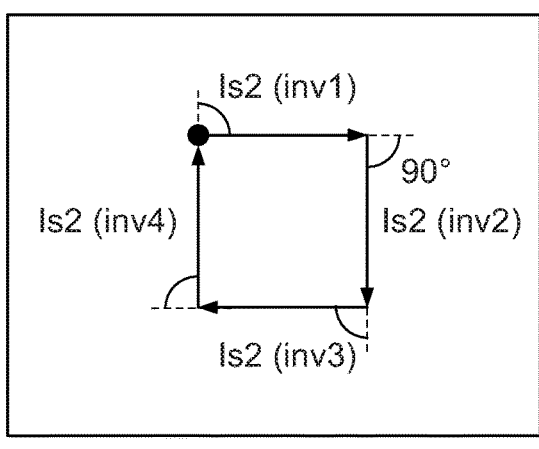
FIG. 16C is a schematic a converter arrangement for a vehicle system.
Figure 16D:
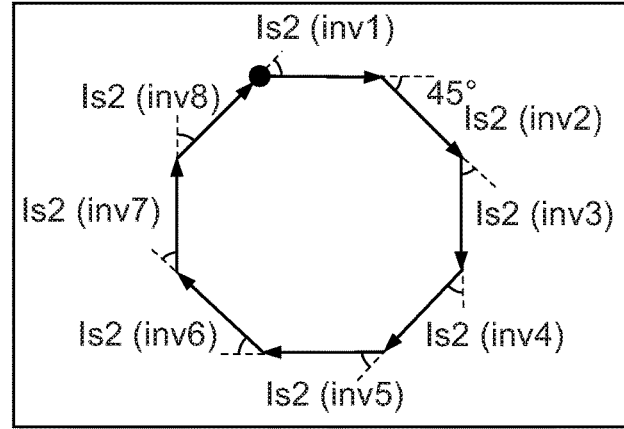
FIG. 16D is a schematic a converter arrangement for a vehicle system.

FIG. 15 illustrates yet another example of a source spectrum when a first converter and a second converter of the system 900 are operating. The controller circuit 902 is used to reduce the THD of the system 900, and the controller circuit 902 is configured to adjust the AC conducted onto the common bus to the plural converters so that a root mean square of a ripple current component of the AC that is converted by the plural converters meets one or more designated criteria. In this example, the designated criteria is to reduce the THD to be less than 19.87% of more than 300 A. To accomplish, the controller circuit 902 has shifted the fundamental voltage in phase. As a result, the THD is reduced to 15.83% of 310.7 A, and the designated criteria has been met. Thus, even as the amps are increased, the THD percent remains below the amount of THD percent when the controller circuit is not used.

FIGS. 16A-16D illustrate different arrangements of converters of a system. In one example, the system is system 900 of FIG. 9. In particular, each figure illustrates how converter 1602 may be arranged. Specifically, based on the arrangement, different switching cycle shifts may be provided to reduce THD. For example, for FIG. 16A a 180° shift may be provided, whereas for FIG. 16B a 60° shift may be provided, for FIG. 16C a 90° shift, and for FIG. 16D a 45° shift. Thus, the shift used to reduce THD may be based on one or more factors, such as, on the arrangement of the converters, number of converters, harmonic frequency (in Hz) of interest to be reduced, root mean square value of the harmonic currents to be reduced (for example, to make the harmonic current to be reduced phase shift, values of the filter components (capacitor or inductor) used for different converters.

Figure 17:
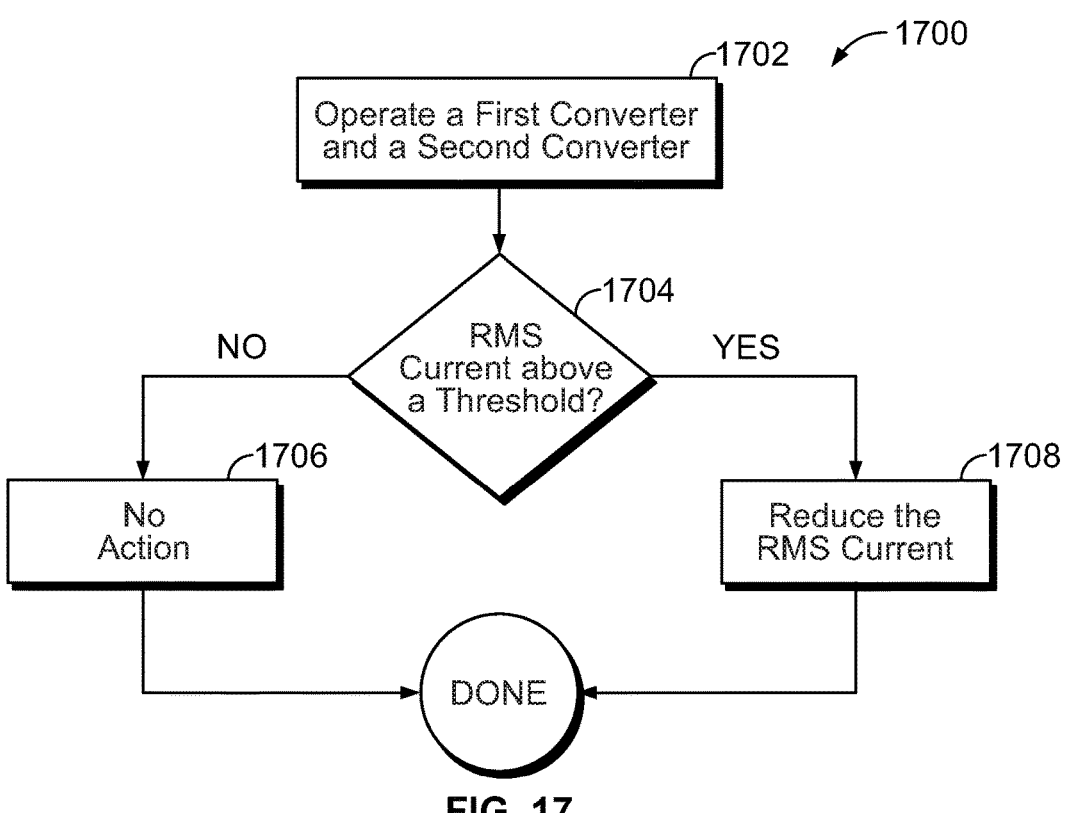
FIG. 17 is a flow chart of a method to reduce a ripple current in a vehicle converter system.

FIG. 17 illustrates a flow chart of a method 1700 to reduce ripple current of a system 900. The method 1700, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1700 may be used as one or more algorithms to direct hardware to perform one or more operations described herein. It should be noted, other methods may be used, in accordance with embodiments herein.

At 1702, at least a first converter and a second converter of a system are operating. In one example, the first converter and second converter are a part of system 900 of FIG. 9. In particular, a system that includes an AC power source that applies AC to an AC common bus may be provided for supplying current to two or more DC loads.

At 1704, a controller circuit may be configured to determine if an RMS current is above a threshold. In one example, the controller circuit is the controller circuit 902 of the system 900 of FIG. 9. For example, the threshold may be a determined non-zero threshold stored in the memory.

At 1706, if the RMS current is below the threshold at 1704, no addition action is taken. If at 1704, the RMS is above a threshold, then at 1708, the controller circuit may reduce the RMS current conducted onto an AC common bus 912, 914. In a first example, the controller circuit may be configured to change the switching frequencies of the first converter and second converter to reduce the RMS current. In another example, the controller circuit may be configured to shift the phase of the current between the first converter and the second converter. The shift may be 90°, 180°, or the like. The determination of the phase shift in one embodiment may depend on the number of convertors and/or the arrangement of the converters within a current system. In yet another example, the controller circuit may be configured to shift the phase of the fundamental voltage.

According to one or more embodiments, a system is provided that may include plural converters that are connected to a common bus. Each of the converters may be configured to convert an alternating current (AC) through the common bus to plurality of DC buses by alternating switches of each of the converters between open and closed states in a switching cycle. The switching cycle may have a switching frequency and a switching phase. The system may also include a controller circuit configured to adjust the AC conducted onto the common bus to the plural converters so that a root mean square of a ripple current component of the AC that is converted by the plural converters meets one or more designated criteria. The controller circuit may be configured to adjust the AC by controlling at least one of the plural converters.

Optionally, the controller circuit may be configured to adjust the ripple current component of the AC by controlling the at least one of the plural converters to apply 1) a phase shift to the switching phase when the switching frequency of the plural converters is the same 2) a frequency shift to the switching cycle of the at least one of the plural converters such that the switching cycle of the at least one of the plural converters having the frequency shift differs from the switching cycle of at least one other converter of the plural converters, or 3) a phase shift in an AC voltage input into the plural converters. In another aspect, the AC may include a fundamental current component and the ripple current component, and the controller circuit only adjusts the ripple current component of the AC. In one example, the system includes a DC load that may receive the DC. In one embodiment, the DC load may be one of a battery or solar converter.

Optionally, the controller circuit may be configured to adjust the AC current by operating the switching cycle of one or more of the plural converters in a first group at a first switching frequency and operating the switching cycle of one or more of the plural converters in a second, different group at a different, second switching frequency. In another example, the controller circuit may be configured to adjust the AC current by operating the switching cycle of one or more of the plural converters to have a phase shift. The phase shift may depend one or more factors, such as, on the arrangement of the converters, number of converters, harmonic frequency (in Hz) of interest to be reduced, root mean square value of the harmonic currents to be reduced (for example, to make the harmonic current to be reduced phase shift, values of the filter components (capacitor or inductor) used for different converters (for example, to make the harmonic current to be reduced phase shift of 90° for 4 inverters or 180° for 2 inverters in terms of angle of a switching cycle. Here angle of 1 switching cycle is considered as 360°). In another aspect, the controller circuit may be configured to apply a frequency shift to the switching cycle of the at least one converter of the plural converters. The frequency shift can be any number, including the numbers multiple of a fundamental current component frequency. In another aspect, the common bus may be a first common bus, and the plural converters are connected to a second common bus. In another aspect, the first common bus may be a positive bus, and the second common bus may be a negative bus. In one example, the designated criteria may include at least one of a total harmonic or demand distortion, a total weighted harmonic, a psophmetric current, or a harmonic. In one aspect, the controller circuit may also be configured to predict the ripple current component conducted onto the common bus from the plural converters and to reduce the ripple current component that is conducted onto the common bus relative to the ripple current component that is captured as predicted by changing the phase or frequency of the switching cycle of the at least one converter of the plural converters. In another aspect, the controller circuit may be configured to conduct DC from a DC load, and convert the DC into AC for input into a transformer.

In one or more embodiments, a system is provided that may include plural converters that are connected to a common bus. Each of the converters may be configured to convert an alternating current (AC) through the common bus to plurality of DC buses by alternating switches of each of the plural converters between open and closed states in a switching cycle. The switching cycle may include a switching frequency and a switching phase. The system may also include a controller circuit that may be configured to adjust the AC conducted onto the common bus to the plural converters so that a root mean square of a ripple current component of the AC that may be converted by the plural converters meets one or more designated criteria. In addition, the controller circuit may be configured to adjust the AC by controlling at least one of the plural converters. The system may also have a master controller configured to be operably coupled with the controller circuit and the plural converters. The master controller may be configured to reduce the ripple current component that is conducted onto the common bus by changing the phase or frequency of the switching cycle of one or more of the plural converters.

Optionally, the controller circuit may be configured to adjust the ripple current component of the AC by changing the switching cycle of the one or more of the plural converters to apply 1) a phase shift to the switching phase when the switching frequency of the plural converters is the same 2) a frequency shift to the switching cycle of the at least one converter of the plural converters such that the switching cycle of the at least one converter of the plural converters having the frequency shift differs from the switching cycle of at least one other of the plural converters, or 3) a phase shift in an AC voltage input into the plural converters.

In one aspect, the master controller may be configured to determine a phase shift to the switching phase to reduce the ripple current component that is conducted onto the common bus. Optionally, the master controller may be configured to predict the ripple current component conducted on the common bus and change the switching cycle of the one or more of the plural converters based on the ripple current component predicted.

In one or more embodiments, a system may be provided that includes plural converters that are connected to a common bus. Each of the plural converters may be configured to convert an alternating current (AC) through the common bus to plurality of DC buses by alternating switches of each of the plural converters between open and closed states in a switching cycle. The switching cycle may have a switching frequency and a switching phase. The system may also include a controller circuit configured to adjust the AC conducted onto the common bus to the plural converters so that a root mean square of a ripple current component of the AC that is converted by the plural converters may meet one or more designated criteria. The controller circuit may be configured to adjust the AC by controlling at least one of the plural converters. Additionally, the controller circuit may be configured to adjust the ripple current component of the AC by controlling the at least one of the plural converters to apply a phase shift to the switching phase.

Optionally, the system may also include a DC load that may receive the DC from the controller circuit. In one aspect, the DC load may be one of a battery or solar converter. In another aspect, the phase shift may be one of 90° or 180°. In another aspect, the common bus is configured to receive the AC from a utility source offboard the vehicle, and plural DC loads respectively are connected to receive the DC from the plural converters, the plural DC loads comprising energy storage devices.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
plural converters connected to a common bus, each of the converters configured to convert an alternating current (AC) through the common bus to a direct current (DC) by alternating switches of each of the converters between open and closed states in a switching cycle having a switching frequency and a switching phase;
a controller circuit configured to adjust the AC conducted onto the common bus to the plural converters so that a root mean square of a ripple current component of the AC that is converted by the plural converters meets one or more designated criteria, the controller circuit configured to adjust the AC by controlling at least one of the plural converters,
wherein the controller circuit is configured to adjust the ripple current component of the AC by controlling the at least one of the plural converters to apply a frequency shift to the switching cycle of the at least one of the plural converters such that the switching cycle of the at least one of the plural converters having the frequency shift differs from the switching cycle of at least one other converter of the plural converters; and
a direct current (DC) load that receives the DC from the controller circuit.

2. The system of claim 1, wherein the AC includes a fundamental current component and the ripple current component, and the controller circuit only adjusts the ripple current component of the AC.

3. The system of claim 1, wherein the DC load is one of a battery or solar converter.

4. The system of claim 1, wherein the controller circuit is configured to adjust the AC current by operating the switching cycle of one or more of the plural converters in a first group at a first switching frequency and operating the switching cycle of one or more of the plural converters in a second, different group at a different, second switching frequency.

5. The system of claim 1, wherein the controller circuit is configured to adjust the AC current by operating the switching cycle of one or more of the plural converters-in a first group to have a first phase shift, and to operate the switching cycle of one or more of the plural converters in a second group to have a different, second phase shift.

6. A system comprising:
plural converters connected to a common bus, each of the converters configured to convert an alternating current (AC) through the common bus to a direct current (DC) by alternating switches of each of the converters between open and closed states in a switching cycle having a switching frequency and a switching phase;

a controller circuit configured to adjust the AC conducted onto the common bus to the plural converters so that a root mean square of a ripple current component of the AC that is converted by the plural converters meets one or more designated criteria, the controller circuit configured to adjust the AC by controlling at least one of the plural converters, wherein the controller circuit is configured to apply a frequency shift to the switching cycle of the at least one of the plural converters that is a multiple of a fundamental current component frequency; and a DC load that receives the DC from the controller circuit.

7. The system of claim 1, wherein the common bus is a first AC common bus, and the plural converters are connected to a second AC common bus.

8. The system of claim 1, wherein the designated criteria include at least one of a total harmonic or demand distortion, a total weighted harmonic, a psophometric current, or a harmonic.

9. The system of claim 1, wherein the controller circuit is also configured to predict the ripple current component conducted onto the common bus from the plural converters and to reduce the ripple current component conducted onto the common bus relative to the ripple current component that is captured as predicted by changing the switching phase or frequency of the switching cycle of the at least one converter of the plural converters.

10. The system of claim 1, wherein the controller circuit is configured to conduct DC from a DC load, and convert the DC into AC for input into a transformer.

11. A system comprising:

plural converters connected to a common bus, each of the converters configured to convert an alternating current (AC) through the common bus to a direct current (DC) by alternating switches of each of the plural converters between open and closed states in a switching cycle having a switching frequency and a switching phase;

a controller circuit configured to adjust the AC conducted onto the common bus to the plural converters so that a root mean square of a ripple current component of the AC that is converted by the plural converters meets one or more designated criteria, the controller circuit configured to adjust the AC by controlling at least one of the plural converters; and a master controller configured to be operably coupled with the controller circuit and the plural converters, the master controller configured to reduce the ripple current component that is conducted onto the common bus by changing the switching cycle of one or more of the plural converters;

wherein the controller circuit is configured to adjust the ripple current component of the AC by changing the switching cycle of the one or more of the plural converters to apply a frequency shift to the switching cycle of the at least one of the plural converters such that the switching cycle of the at least one converter of the plural converters having the frequency shift differs from the switching cycle of at least one other of the plural converters.

12. The system of claim 11, wherein the master controller is also configured to determine a phase shift to the switching phase to reduce the ripple current component that is conducted onto the common bus.

13. The system of claim 11, wherein the master controller is configured to predict the ripple current component conducted on the common bus and change the switching cycle of the one or more of the plural converters based on the ripple current component.

14. The system of claim 6, wherein the DC load is one of a battery or solar converter.

15. The system of claim 6, wherein the common bus is configured to receive the AC from a utility source offboard a vehicle that includes the plural converters; and wherein plural DC loads respectively are connected to receive the DC from plural converters, the plural DC loads comprising energy storage devices.

* * * * *